United States Patent
Thompson et al.

(10) Patent No.: US 9,385,947 B2
(45) Date of Patent: *Jul. 5, 2016

(54) MESSAGE TRANSPORT SYSTEM USING PUBLICATION AND SUBSCRIPTION MECHANISMS

(71) Applicant: Microsoft Technology Licensing, LLC, Redmond, WA (US)

(72) Inventors: Daniel Thompson, Duvall, WA (US); Michael K. Liptack, Monroe, WA (US); James M. Lyon, Redmond, WA (US); Robert Hanz, Redmond, WA (US); Guhan Suriyanarayanan, Redmond, WA (US); Chien-Lung Yu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 41 days.

This patent is subject to a terminal disclaimer.

(21) Appl. No.: 14/179,663

(22) Filed: Feb. 13, 2014

(65) Prior Publication Data

US 2014/0161129 A1    Jun. 12, 2014

Related U.S. Application Data

(63) Continuation of application No. 12/698,143, filed on Feb. 2, 2010, now Pat. No. 8,675,518.

(51) Int. Cl.
*H04L 12/725* (2013.01)
*H04L 12/28* (2006.01)
(Continued)

(52) U.S. Cl.
CPC .............. *H04L 45/308* (2013.01); *H04L 12/28* (2013.01); *H04L 45/44* (2013.01); *H04L 45/74* (2013.01)

(58) Field of Classification Search
CPC .............................. H04L 12/28; H04L 45/308
See application file for complete search history.

(56) References Cited

U.S. PATENT DOCUMENTS

2004/0076155 A1    4/2004   Yajnik et al.
2004/0122906 A1    6/2004   Goodman et al.
(Continued)

FOREIGN PATENT DOCUMENTS

CN    101051995 A    10/2007
CN    101193077 A    6/2008
CN    101355490 A    1/2009

OTHER PUBLICATIONS

First Office Action and Search Report Received in China Patent Application No. 201110037493.2, Mailed Date: Aug. 26, 2014, 17 Pages.
(Continued)

*Primary Examiner* — Dang Ton
*Assistant Examiner* — Kevin Lee
(74) *Attorney, Agent, or Firm* — Henry Gabryjelski; Kate Drakos; Micky Minhas (57) ABSTRACT

A message transport system may use a publication subscription mechanism to connect nodes and transport messages through the nodes. Each node may establish connections to other nodes, and subscription requests and publication notifications may be passed across the nodes to establish paths for messages. When a message is published, the message may be passed over those connections for which a subscription is active. A path identifier may be added to the message as it is passed between nodes, and the path identifier may be used by a subscribing node for identification of the information being received. When a subscriber notification is removed, the path may be deconstructed across multiple nodes. The nodes may be arranged such that each node is agnostic to any connections past the nodes to which it is connected, and may allow any node to subscribe to any information published within the network.

21 Claims, 6 Drawing Sheets

(51) Int. Cl.
*H04L 12/721* (2013.01)
*H04L 12/741* (2013.01)

(56) References Cited

U.S. PATENT DOCUMENTS

2006/0200551 A1 9/2006 Bali et al.
2007/0271189 A1 11/2007 Morten et al.
2008/0095144 A1 4/2008 Goldberg
2008/0133541 A1 6/2008 Fletcher et al.
2008/0137569 A1 6/2008 Sang et al.
2010/0118874 A1 5/2010 Li

OTHER PUBLICATIONS

Pesonen, et al., "A Capability-Based Access Control Architecture for Multi-Domain Publish/Subscribe Systems", in International Symposium on Applications and the Internet, Jan. 23, 2006, 7 Pages.
Bharambe, et al., "Mercury: A Scalable Publish Subscribe System for Internet Games", in Proceedings of the 1st Workshop on Network and System Support for Games, Apr. 16, 2002, pp. 3-9.
Carzaniga, et al., "A Benchmark Suite for Distributed Publish/Subscribe Systems", in Technical Report CU-CS-927-02, Apr. 2002, 8 Pages.
Majumdar, et al., "Addressing Broker Violations of Count Integrity in Publish-Subscribe Systems", Retrieved at <<http://www.cs.ucr.edu/-smajumdar/pubsub.pdf>>, in Proceedings of ACM Infocom, 2007, Retreived on Dec. 9, 2009, 2 Pages.
Lumezanu, et al., "Decentralized Message Ordering for Publish/Subscribe Systems", in Proceedings of the ACM/IFIP/USENIX International Conference on Middleware, Nov. 1, 2006, pp. 162-179.
Bacon, et al., "Access Control in Publish/Subscribe Systems", in Proceedings of the Second International Conference on Distributed Event-based Systems, Jul. 1, 2008, pp. 23-34.
Querzoni, Leonardo, "A Self-Healing Network for Content-Based Publish/Subscribe Systems", Retrieved at <<http://www.cis.uniroma1.it/~midlab/articoli/Q04DSN.pdf>>, in Student Forum supplemental volume for the IEEE International Conference on Dependable Systems and Networks, 2004, Retrieved on: Dec. 10, 2009, 2 Pages.
Non-Final Office Action Received for U.S. Appl. No. 12/698,143, Mailed Date: Mar. 2, 2012, Filed Date: Feb. 2, 2010, 23 Pages.
Final Office Action Received for U.S. Appl. No. 12/698,143, Mailed Date: Mar. 14, 2013, Filed Date: Feb. 2, 2010, 24 Pages.
Notice of Allowance Received for U.S. Appl. No. 12/698,143, Mailed Date: Oct. 11, 2013, Filed Date: Feb. 2, 2010, 16 Pages.
Second Office Action Issued in China Patent Application No. 201110037493.2, Mailed Date: May 13, 2015, 15 Pages.
Third Office Action and Search Report Issued in Chinese Application No. 201110037493.2, Mailed Date: Nov. 17, 2015, 12 Pages.

MESSAGE TRANSPORT SYSTEM USING PUBLICATION AND SUBSCRIPTION MECHANISMS

CROSS-REFERENCE TO RELATED APPLICATION(S)

This application is a continuation of U.S. patent application Ser. No. 12/698,143, entitled "Message Transport System Using Publication and Subscription Mechanisms," filed Feb. 2, 2010, which is incorporated herein by reference in its entirety.

BACKGROUND

In a computer system or computer network, many different services may generate information that may be consumed by other services. For example, a new user wizard may create a new user profile that may be consumed by an email service, an authentication service, and other services. Each of the various services may consume the output of the new user wizard.

SUMMARY

A message transport system may use a publication subscription mechanism to connect nodes and transport messages through the nodes. Each node may establish connections to other nodes, and subscription requests and publication notifications may be passed across the nodes to establish paths for messages. When a message is published, the message may be passed over those connections for which a subscription is active. A path identifier may be added to the message as it is passed between nodes, and the path identifier may be used by a subscribing node for identification of the information being received. When a subscription notification is removed, the path may be deconstructed across multiple nodes. The nodes may be arranged such that each node is agnostic to any connections past the nodes to which it is connected, and may allow any node to subscribe to any information published within the network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A network of nodes may be constructed to connect publishing nodes and subscribing nodes. The nodes may transmit their publishing notifications and subscription requests to other nodes, which may forward the notifications and requests across other nodes until a match is found. The match may establish a distribution path for published information to be transmitted to a subscribing node.

The network may allow various services that consume information to connect to services that provide information, without either of the services knowing an address or location of the other. Such a network may enable services that supply or consume information to be added to a system easily.

After a connection between a publisher and a subscriber is established, communications may be passed from node to node with each node adding an incoming connection identifier, an outgoing connection identifier, and a node identifier to the communication. When the communication is received by the subscriber, the identity of the connection may be the sequence of nodes and the respective connection identifiers.

Each node may monitor the status of the subscription paths established through the node. If a subscription path is no longer active, the node may notify those nodes that subscribe to the subscription path that the path is no longer active.

The published items may be in the form of persistent publications or one-shot publications. Persistent notifications may persist over time and may be obtained by a newly added node. A persistent notification may last as long as the publisher is reachable and maintains the notification. A one-shot notification may be transitory and be available only to those subscribing devices that are connected at the time the notification is published.

The subscription requests and published items may have associated categories. The categories may allow requests to be matched with publications. In one example, a subscription request may indicate one or more categories within a taxonomy of categories and the subscription request may be matched to a publication source that produces any information within the indicated categories.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Figure 1:
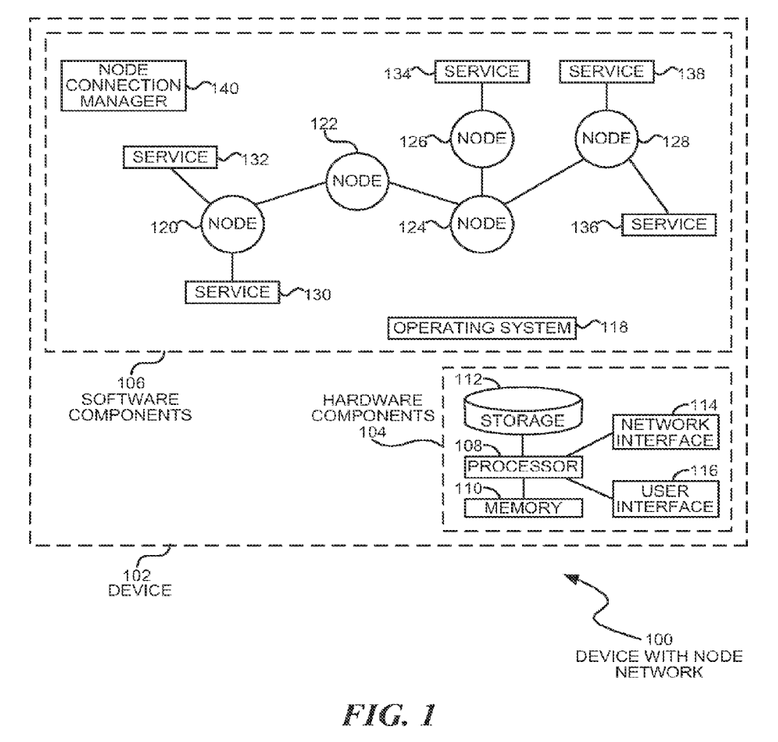
FIG. 1 is a diagram illustration of an embodiment showing a device in which a node based network may operate.

FIG. 1 is a diagram of an embodiment 100, showing a system with an internal network for connecting various services. Embodiment 100 is a simplified example of a node based network that may allow various services within the system to communicate with each other using a publication/subscription methodology.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 illustrates a system in which various services may connect with each other using a publication/subscription system. Each of the various services may generate or consume information, and many of the services may perform both generation and consumption. Information within the system may be identified by various classifications and those services that consume specific types of information may connect with those services that generate the information.

The services that consume information may not be aware of the services that generate the information and vice versa. Because the information generator services are agnostic to the various consumers, information consumers may be added or removed without affecting the information generators. Similarly, the information generators may be added or removed without affecting the information consumers.

One use scenario may be the operations of a server computer for a computer network. The server computer may have many different types of services that operate on the hardware platform, such as authentication services, file management services, email and messaging services, computer update services, and many other services.

In the use scenario, an administrative console application may perform an "add user" operation. The administrative console may gather various details about a new user, such as the new user's access privileges, an account type, personal details about the user, an assigned user name, email address, and other details. This information may be consumed by many different services on the server. For example, the authentication service may add the new user and configure the user's accounts and access privileges, and the messaging service may configure a mailbox and apply policies according to the account type.

The network may allow various services to share information without having to define the connections between the services. Services that consume information may send out subscription requests across the network. The subscription requests may identify the type of information that the service can consume. Other services may publish information and the published items may be transmitted across the network to the subscribers.

For each publisher, there may be one, two, or many more subscribers. In some cases, a subscriber may not exist. Subscribers may be added or removed without affecting the publisher or changing the publisher's configuration.

The information transmitted across the network may be classified using different taxonomies or classification schemes. In some cases, the information may be classified using detailed schemas, while in other cases, the information may be classified using general descriptions of the information. The classification may identify the information consumed by the subscriber and establish a connection between the subscriber and publisher.

The nodes may be arranged by connecting one node to another in a tree other formation. The nodes may not include a 'root node' or other centralized node, but each node may be connected to one or more nodes such that there are no circular connections. Because a 'root node' is not utilized, a broken connection may allow the fractured portions of the network to operate independently until the connection is restored.

When the nodes are connected, a subscriber node may generate a subscription request and transmit that request to neighboring nodes. The neighboring nodes may each add their addresses to the request and transmit the request upstream to other nodes. As the request passes from node to node, a trail of connection identifications and node identifications may be added to the request until the request reaches a publication node that can supply the requested information. The trail of connection identifications may be used to transmit a published item along the same trail to the subscriber.

Each node may also monitor the connections from which subscription requests have been received. When a connection is broken or goes down for some reason, the node may recognize the breakage and create a message that is passed upstream to the nodes along the trail of nodes to the publisher node. In this manner, subscriptions may be deprecated gracefully and completely.

The published items may come in several different forms. A snapshot publication may be one that will be published for any subscriber currently available. In many cases, a snapshot publication may be useful for time sensitive information transfer.

Another publication form may be a persistent publication. A persistent publication may be transmitted when the published item is created, but also may be persisted or stored for when a subscriber connects to the network at a later time. A persistent published item may be stored and kept available over a period of time. In some embodiments, a persistent published item may be stored on the node from which it was published, while in other embodiments, other nodes may store and persist the published item. In some cases, a persistent published item may have a time stamp or other indicator that may be used to remove or destroy the persistent published item at a predefined time.

A published item may include updates to the item. For example, a published item may be a progress meter for completing an action. Initially, the published item may be a progress bar with zero percent complete. As the action progresses, the publisher node may update the published item with the current percent completion. The updates may be transmitted periodically, and may include an identifier for the original published item so that the subscribers may identify the updated information with the original published item.

The device 102 in embodiment 100 may be a single computer system on which several services may operate. In many embodiments, the device 102 may be a server computer, personal computer, or other similar device. In some cases, the device 102 may be a portable device, such as a laptop computer, netbook computer, smartbook computer, cellular telephone, or other device. The device 102 may be a network appliance, game console, network routing device, measuring instrument, or any other computing device.

The device 102 may have various hardware components 104 and software components 106. The example of device 102 may be for a conventional general purpose computing device, but other embodiments may have specialized hardware or firmware components that perform some or all of the functions described for the software components 106. Other embodiments may also implement one or more of the hardware components in software.

The hardware components 104 may include a processor 108, random access memory 110, and nonvolatile storage 112. Some systems may have several processors and various types of random access memory or nonvolatile storage. In some embodiments, a nonvolatile memory component may be used for both random access memory and nonvolatile storage.

The hardware components 104 may also include a network interface 114 and user interface 116. The network interface may be any type of connection to another device, including hardwired network interfaces and wireless network interfaces of short, medium, and long range. The user interface components may be any type of input and output device used to communicate with a user. In some embodiments, a device may have a software user interface that may be accessed using a web browser or other remote access technology.

The software components 106 may include an operating system 118. The operating system 118 may provide an abstraction layer between hardware components and the various software components, as well as different functions that software components may use.

A network may be created by nodes 120, 122, 124, 126, and 128, along with the services 130, 132, 134, 136, and 138. The nodes 120 through 128 may be considered 'transport nodes' that may not publish or subscribe but may merely transport or connect other nodes. The services 130 through 138 may act as nodes that either publish or subscribe. In many cases, a service may act as both a publisher node and a subscribing node and, in some cases, also as a transport node.

When the network is being formed, each node may communicate with a node connection manager 140 to receive an address of another node to which that node may connect. The node connection manager 140 may be located at a predefined address and may keep track of the existing nodes within the network. When an unattached node seeks to attach to the network, the unattached node may send a request to the node connection manager 140 and may receive an address for a node to which the unattached node may connect.

The term "services" is used in the specification and claims to identify any type of process, thread, application, service, or software entity that may send or receive information over the node based network. The term "services" is used as a generic term for any type of software entity.

Several embodiments illustrated later in this specification show examples of how detailed operations of the network may function. A detailed example of a small network and the naming conventions used in an example embodiment is illustrated in embodiment 200. A method for connecting a new node to a network is illustrated in embodiment 300. An example of a method for subscribing is shown in embodiment 400, and two methods for publishing are illustrated in embodiments 500 and 600.

Figure 2:
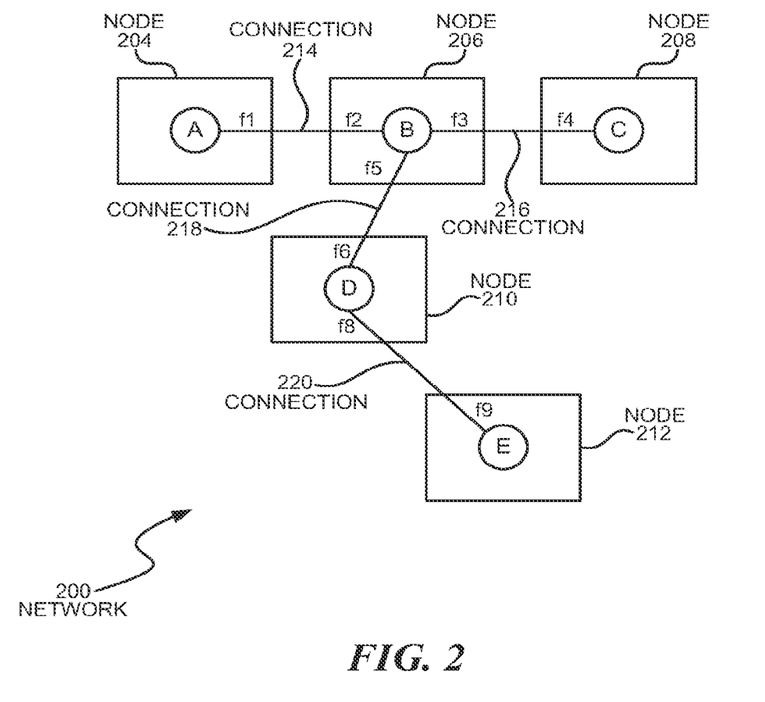
FIG. 2 is a diagram illustration of an example embodiment of a node based network.

FIG. 2 is a diagram of an embodiment 200, showing an example network with various nodes and connections. Embodiment 200 is a simplified example of a network that may illustrate naming conventions of various operations performed across the network.

Embodiment 200 shows a network having five nodes 204, 206, 208, 210, and 212. Node 204 is connected to node 206 through connection 214. Node 206 is connected to node 208 through connection 216 and to node 210 through connection 218. Node 210 is connected to node 212 through connection 220.

Each time a message is passed through a node, the node may add various identification to the message as it is passed along. In some embodiments, the nodes may add node identification to the message by appending the node identification to a chain of identifications for the message. The subscribing node may use the chain of identifications as a label for the source of the published item.

For example, assume that node 212 is a publishing node and node 204 is a subscribing node. A message passed from node 212 to node 210 may have the node identifier "E". Node 210 may pass the message to node 206 and may append the identifier "D" to the chain of identifications. Similarly, node 206 may receive the message, append "B" to the chain of identifications, and pass the message to node 204. The message received by node 204 may have a chain of identifications that may be "E/D/B".

For the purposes of example, the notation for a chain of identifications may be designated as a sequence of identifiers separated by a forward slash. Other embodiments may use different syntax, different designators, and different mechanisms to store the chain of identifiers. The examples illustrated here are merely simplified examples used to illustrate the concepts of a chain of identifications.

In such embodiments, the identifier for each node may be assigned by a node connection manager so that no duplicate names are used by each node.

In another embodiment, each node may identify each connection to the node with a specific identification. For example, node 206 may identify connection 214 as "f2" and node 204 may identify the same connection as "f1". The connection identifiers may be used to create a chain of identifiers.

For example, a message passed from node 212 to node 204 may have a chain of identifiers as "D:f8/B:f5/A:f1", where the identifier before the colon is the node identifier and the identifier after the colon is the incoming connection identifier.

In another example, the same message may have a chain of identifiers as "E:f9::D:f8/D:f6::B:f5/B:f2::A:f1". In such an example, the outgoing connection and incoming connection identifier for each node may be included in the chain of identifiers.

In still another example, the same message may have a chain of identifiers only including the receiving connection identifiers. Such an example may designate a message from node 212 to node 204 as "f8:f5:f1". Such an example may include all of the incoming connection designators and may fully define a return path. In such an embodiment, each connection may or may not use the same designator as another node for the connection.

As each node receives a message, the node may add some form of identification to the message and pass the message along. By adding the identification, the node may create a new message. In some embodiments, the new message may be the original message with merely a metadata change.

The chain of identifications may be used for creating connections between subscribing nodes and publishing nodes. As a subscription request is passed along the network, the chain of identifications may be used as an address or routing identifier by a publisher node to send a published item. A subscribing node may use the chain of identifications to identify the source of a published item when the published item is received.

In some embodiments, each node may create its own designator for connections and node identification. In such embodiments, two or more nodes may use the same node identifier and may also use the same connection identifier. In other embodiments, such as embodiment 200, the nodes may be identified so that no two connections share the same identifier.

Figure 3:
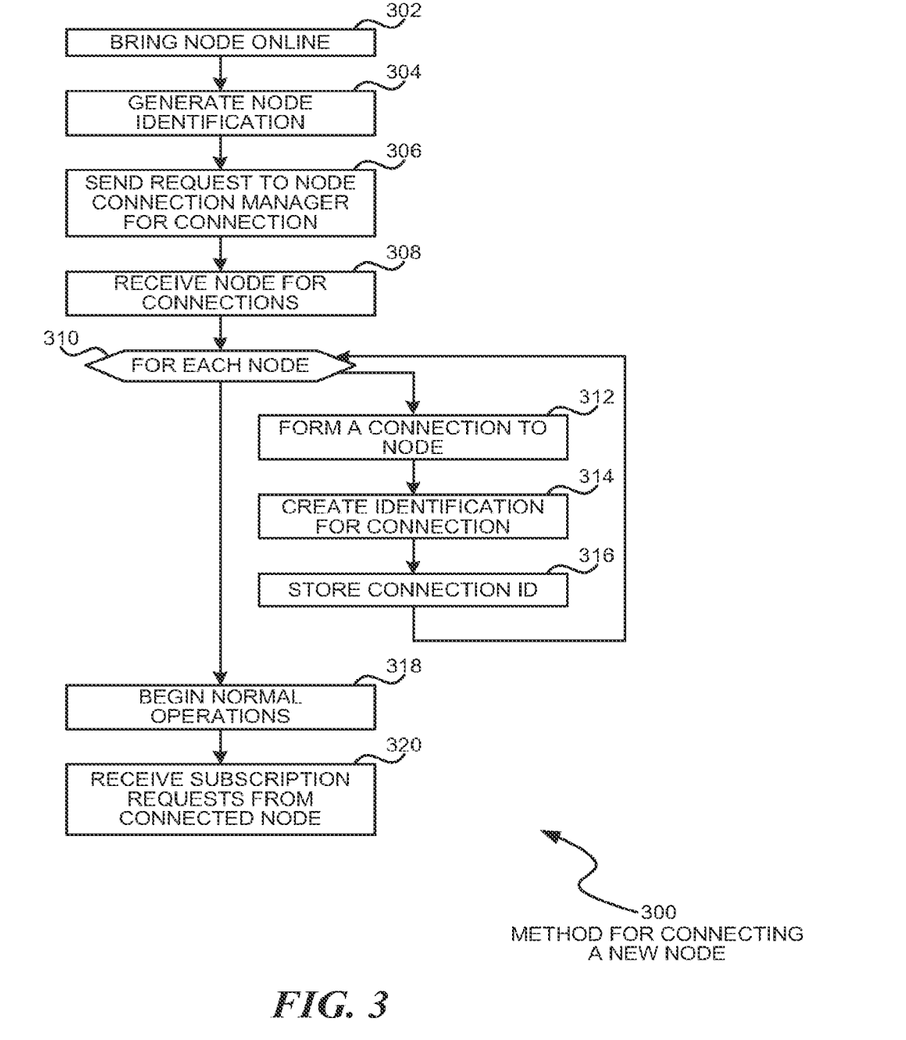
FIG. 3 is a flowchart illustration of an embodiment showing a method for connecting a new node into a network.

FIG. 3 is a flowchart illustration of an embodiment 300 showing a method for connecting a new node to a network. Embodiment 300 is an example of a method that may be performed when adding a new transport node, subscriber node, or publisher node.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The node may be brought online in block 302. In an embodiment like embodiment 100 where the entire network is located within the sphere of a single device, the node may be a service that may communicate with another service.

A node identification may be generated in block 304. In block 306, a request may be sent to a node connection manager for a connection to another node.

In some embodiments, the node connection manager may return a query with a designated identifier for the node. In such an embodiment, the node may perform the query in block 306 and may receive the node identifier from the node connection manager. In other embodiments, such as in embodiment 300, the node itself may create an identifier.

The identifiers used to identify nodes and connections between nodes may be any type of identifier. In some cases, the identifiers may be simple integer numbers or alpha numeric designators. In other cases, the identifiers may be complex series of designators. In some embodiments, node identifiers and connection identifiers may be Globally Unique Identifier (GUID), Universally Unique Identifier (UUID), Locally Unique Identifier (LUID), or other unique identifier.

After requesting a node connection in block 306, a neighboring node may be received in block 308. The neighboring node may be any node in the network. In many embodiments, the network may be created so that there are no circular paths within the network. One mechanism for creating such a network may be to add the next node to the last node that was added. Such a mechanism may create a network that has a long, linear shape.

Another mechanism may be to add a new node to any existing node in the network. If a random node was selected and the new node was connected to only one other 'upstream' node, the network may form a tree network with many branches and leaf nodes.

In some cases, the node connection manager may use intelligence to group certain nodes together. For example, nodes for certain services or types of services may be connected near each other to minimize lengthy transits between publishers and subscribers. Such intelligence may be in the form of rules, policies, algorithms, or other mechanism for determining a node to which a new node may connect. Such embodiments may be useful in larger networks.

Each node received in block 308 may be processed in block 310. In many embodiments, a node may be given a single node to connect in block 308, but some cases, two or more nodes may be designated by the node connection manager.

For each node in block 310, a connection may be formed to the node in block 312 and an identifier may be created for the connection in block 314. The connection identifier may be stored in block 316.

After adding connections to the designated nodes in block 310, normal node operations may begin in block 318.

When the node begins normal operations, the node to which the current node is connected may transmit any existing subscription requests that are available across the network in block 320. If the current node provides published items that match any of the subscription requests, the current node may store the subscription requests for the time when a published item becomes available.

Figure 4:
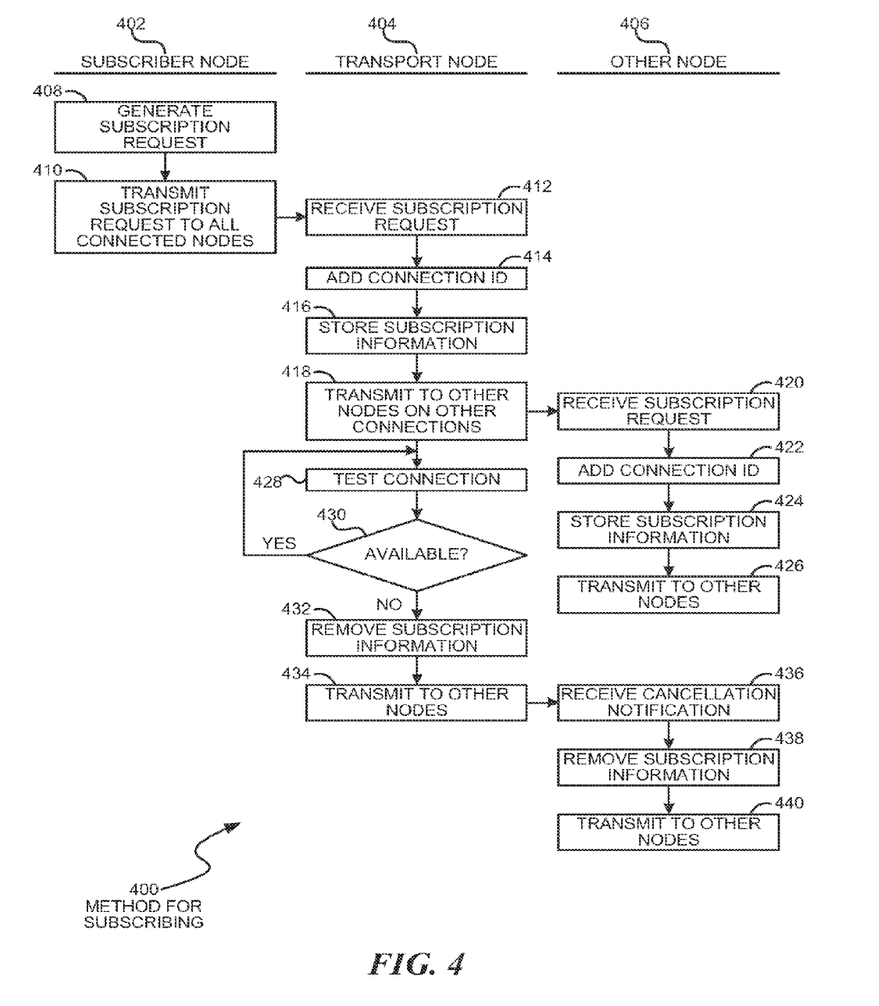
FIG. 4 is a timeline illustration of an embodiment showing a method for subscribing.

FIG. 4 is a timeline illustration of an embodiment 400 showing a sequence for subscribing between nodes of a network. Embodiment 400 is an example of a method that may be performed by a subscriber node 402, and transport node 404, and another node 406 to pass subscription information along the network.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is a simplified example of one method for creating a subscription and managing the subscription in a network. Embodiment 400 passes subscription information upstream until the subscription information reaches a publisher node.

Embodiment 400 is an example where the subscription information may be passed upstream to other nodes and the subscription information may be cached or stored on each of the nodes. If a connection to the subscribing node is lost, the subscription may be cancelled and the cancellation may be passed upstream so that the subscription may be removed from all nodes in the network.

The actions of a subscriber node 402, a transport node 404, and another node 406 are illustrated. In many embodiments, each node may operate as a subscriber, transport, or publisher node. A transport node may connect two or more nodes together. A transport node may also operate as a subscriber node and as a publisher node in some cases. In some cases, a subscriber node or publisher node may be a leaf node or end node in a network. Some subscriber nodes may operate solely as a subscriber node and some publisher nodes may similarly operate solely as a publisher node. In some cases, a subscriber node may operate as both a subscriber and publisher.

A subscriber node 402 may generate a subscription request in block 408. The subscription request may include a description of the type of information the subscriber node may consume. The description may be a general classification of the type of information.

In some embodiments, a hierarchical taxonomy may be used to describe the requested information. In a hierarchical taxonomy, information types may be arranged by an ordered classification with parent/child relationships between the various information types. In such an embodiment, a subscriber may request information for a patent type and any publisher that produces the parent type or any child type may create a subscription for the subscriber.

The subscription request may be transmitted to all connected nodes in block 410. In the case where a subscriber node 402 is connected to multiple nodes, the subscription request may be transmitted to all of the nodes. The subscription request may be processed by each node in a similar manner as will be described for the transport node 404, and the subscription request may be passed along every node of the network. Any publisher node that generates items that match the subscription criteria will create a subscription path to the subscriber node 402.

Each node in the network may process the subscription request as the transport node 404 in embodiment 400.

The transport node 404 may receive the subscription request in block 412, add a connection identification in block 414, and store the subscription information in block 416. The transport node 404 may transmit the updated subscription request to all of the other nodes to which the transport node has connections in block 418.

The stored subscription request from block 416 may be used to keep track of any subscription requests across the network. If a new node were to attach to the transport node 404, the transport node 404 may transmit a copy of all of the stored subscription requests to the new node so that the new node can determine if it has any published items that match any of the subscription requests.

The operations of block 414 may create a new subscription request that contains the connection identification for the connection on which the transport node 404 has received the subscription request. The connection identification may be used at a later time as an address to which to transmit a published item to the subscriber node 402.

The other node 406 may receive the subscription request in block 420, add a connection identification in block 422, store the subscription request in block 424, and transmit to other nodes in block 426.

The operations of blocks 420 through 426 mimic the operations of blocks 412 through 418 of the transport node 404, and reflect the mechanism by which the subscription request may be passed through every node of the network.

The transport node 404 may test the connection to the subscriber node 402 in block 428. If the connection is still available in block 430, no action is taken and the process may return to block 428.

If the connection to the subscriber node 402 is unavailable in block 430, the subscription information may be removed from the transport node in block 432 and a message cancelling the subscription may be transmitted to all other nodes in block 434.

The other node 406 may receive the cancellation notification in block 436, remove the subscription information in block 438, and transmit the cancellation notification to other nodes in block 440.

Not shown in embodiment 400, the other node 406 may also monitor the connection between the transport node 404 and the other node 406 in a similar manner as blocks 428 through 434. If the connection between the transport node 404 and the other node 406 is broken, the other node 406 may detect the breakage and cause the subscription to be cancelled on any nodes connected to the other node 406.

The mechanism of monitoring a connection and cancelling a subscription request may be useful in cleaning up subscription requests when a connection fails. The breakage may create a splintered network with two portions. The portion with the original subscription request may continue to have the subscription request and may function with any publisher nodes that can service the subscription request. The portion of the network that is no longer connected to the subscriber node may also continue to function, but the subscription request that cannot be fulfilled because of the broken connection may be removed.

Figure 5:
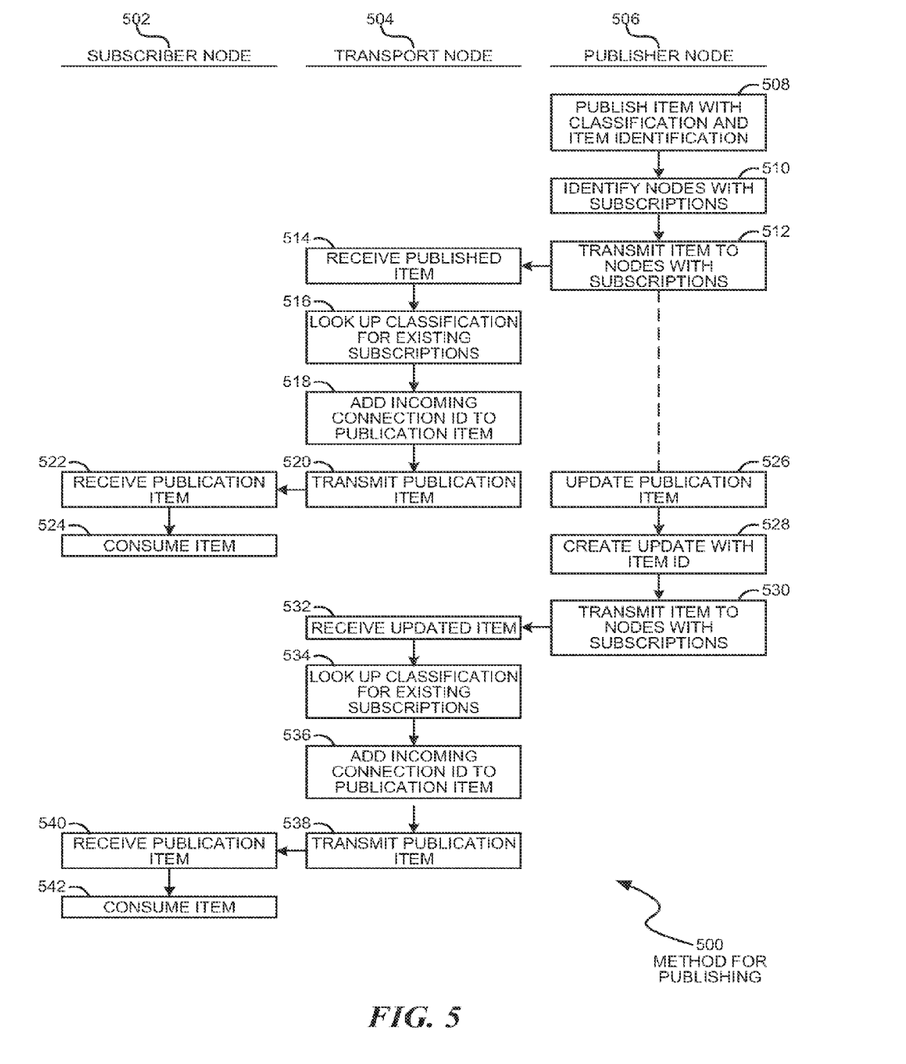
FIG. 5 is a flowchart illustration of an embodiment showing a method for publishing.

FIG. 5 is a timeline illustration of an embodiment 500 showing a sequence for publishing an item. Embodiment 500 is an example of a method that may be performed by a subscriber node 502, and transport node 504, and a publisher node 506 to pass a published item along the network.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 is an example of a published item that may be sent to subscribers, then updated at a later time.

A simple example of such a published item may be a progress bar item. The published item may include a percent complete for an activity. As the activity is performed, the publisher may periodically update the percent complete and transmit the update over the network.

In some embodiments, an updated published item may be re-transmitted in full with the updated information. In other embodiments, the updated information may be transmitted with an identifier for the original published item. When the updated information only is transmitted, the message size may be much smaller than in cases where the entire published item is re-transmitted.

A publisher node 506 may publish an item with classification and item identification in block 508. The classification may define the type of information included in the published item. The classification may be used to identify those subscribers that have requested to receive that type of item and can be used to fulfill a subscription request.

The item identification may be an identifier for the published item so that the subsequent updates referencing the item identification may be treated by a subscriber as updates to an existing published item and not treated as a new published item. In some cases, the item identification may be a simple sequential number that the publisher node 506 may generate for each successive published item. In other cases, the item identification may be a GUID or other unique identification.

The nodes with subscriptions may be identified in block 510. The subscribing nodes may be identified by a process such as the one illustrated in embodiment 400, where any subscriber node may create a subscription request and transmit that request across all available nodes of the network.

Each publisher node 506 may maintain a list of the subscriber nodes and the list may include the chain of identifiers for the subscription request. The chain of identifiers may be used as a network routing mechanism, and may identify each connection over which the published item may be transmitted to reach a subscriber node.

In block 514, the transport node 504 may receive the published item.

In some embodiments, the transport node 504 may look up the classification for any existing subscriptions and match the published item's classification to any saved subscription requests, as in block 516.

In other embodiments, the transport node 504 may receive a published item with the subscription request's chain of identifiers and may use the chain of identifiers to identify the subscriber mode 502.

The transport node 504 may add the incoming connection identifier to the published item in block 518 and transmit the published item to the subscriber node 502 in block 520.

The subscriber node 502 may receive the item in block 522 and consume the item in block 524.

The publisher node 506 may update the published item in block 526 and create an update in block 528 using the item identifier from block 508. The publisher node 506 may transmit the item in block 530.

The transport node 504 may receive the updated item in block 532, optionally lookup the classification in block 534, add the incoming connection identifier in block 536, and transmit the updated publication item in block 538.

The subscriber node 502 may receive the published item in block 540 and consume the item in block 542. Because the published item in block 540 may contain the same item identifier as in block 522, the subscriber node 502 may process the item received in block 540 as an update rather than as a new instance of the published item.

Figure 6:
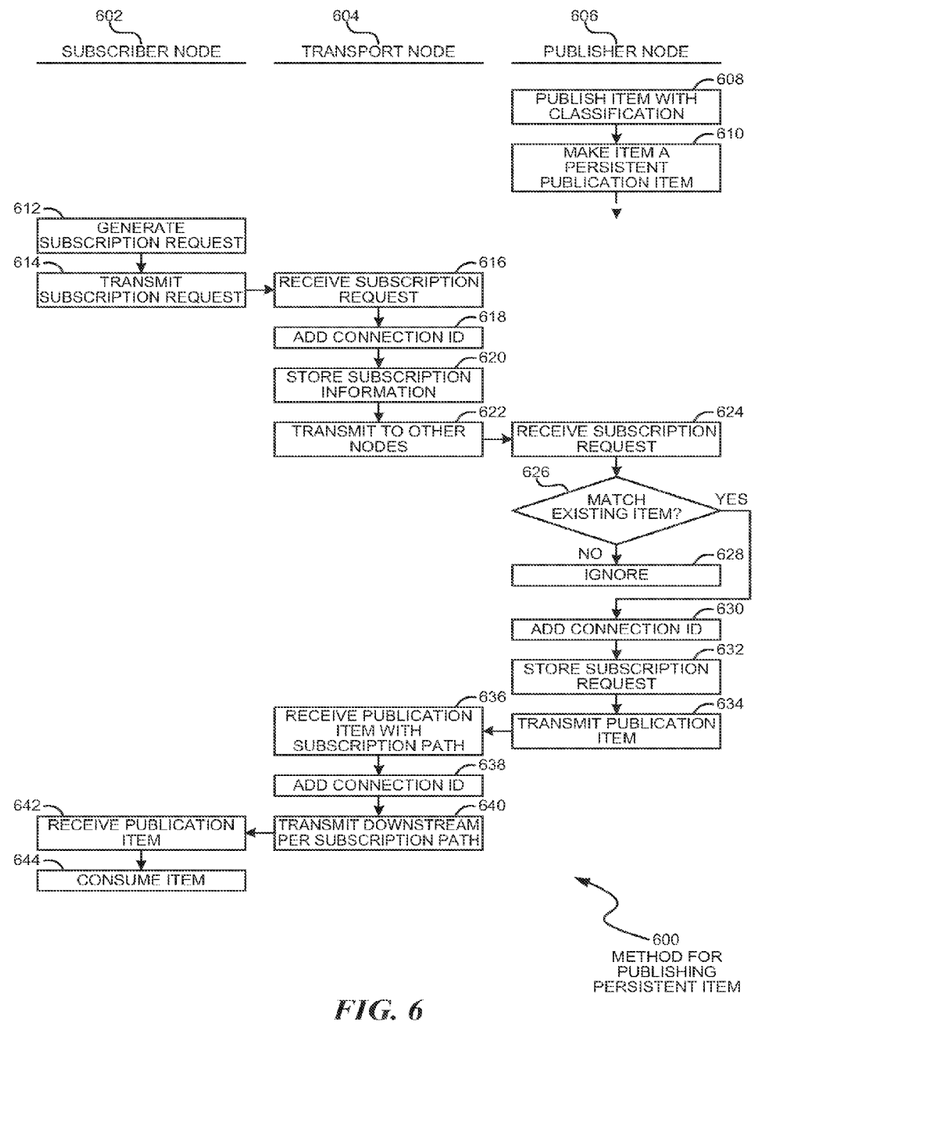
FIG. 6 is a flowchart illustration of an embodiment showing a method for publishing a persistent item.

FIG. 6 is a timeline illustration of an embodiment 600 showing a sequence for publishing an item where the item may be a persistent publication item. Embodiment 600 is an example of a method that may be performed by a subscriber node 602, and transport node 604, and a publisher node 606 to pass a published item along the network.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 is an example of a persistent publication item. A persistent publication item may be made available to subscriber nodes that may come online or issue a subscription request for a publication item after the item is published. The persistent publication item may be stored for retrieval on request.

Some embodiments may have a one-shot publication mechanism. In a one-shot publication mechanism, the published item may be transmitted across the network to subscriber nodes but the published item may be transitory and not be stored.

In block 608, an item may be published with a classification and the item may be made persistent in block 610.

At a later time, the subscriber node 602 may generate a subscription request in block 612 and transmit the subscription request in block 614. The operations of blocks 612 and 614 may be similar to blocks 408 and 410 of embodiment 400.

The transport node 604 may receive the subscription request in block 616, add a connection identification in block 618, store the subscription information in block 620, and transmit the subscription request to other nodes in block 622. The operations of blocks 616 through 622 may be similar to that of blocks 412 through 418 of embodiment 400.

The publisher node 606 may receive the subscription request in block 624. If the subscription request does not match the existing item in block 626 or any potential item published by the publisher node 606, the subscription request may be ignored in block 628.

If the subscription request matches the existing publication item in block 626, the connection identification may be added to the subscription request in block 630 and the subscription may be stored in block 632.

In response to the subscription request, the persistent published item may be transmitted in block 634 and received by the transport node 604 in block 636. The transport node 604 may add the connection identification in block 638 and transmit the published item per the subscription path in block 640. The subscriber node 602 may receive the published item in block 642 and consume the item in block 644.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
  one or more processors;
  a plurality of services that operate on the one or more processors, the plurality of services comprising:
    a plurality of nodes that includes a subscriber node, a publisher node, and a plurality of transport nodes between the subscriber node and the publisher node,
    the publisher node configured to produce a publication item,
    the subscriber node configured to consume the publication item,
    each node of the plurality of nodes having a connection with at least one other node of the plurality of nodes, each of the plurality of transport nodes and at least one of the subscriber node or the publisher node configured to add at least one of an incoming connection identifier, an outgoing connection identifier, or a node identifier to a request that is provided from the subscriber node to the publisher node to identify a path across which the request passes from the subscriber node to the publisher node, the request corresponding to the publication item, the incoming connection identifier identifying a connection from which the request is received by the respective node, the outgoing connection identifier identifying a connection to which the request is provided by the respective node, and the node identifier identifying the respective node.

2. The system of claim 1, wherein the request for the publication item includes a subscription classification that indicates a type of information the subscriber node is capable of consuming.

3. The system of claim 2, wherein the publication item includes a publication classification that indicates a type of information included in the publication item.

4. The system of claim 3, wherein the publisher node is configured to determine whether the subscription classification corresponds to the publication classification; and wherein the publisher node is further configured to provide the publication item for the subscriber node in response to a determination that the subscription classification corresponds to the publication classification.

5. The system of claim 4, wherein the publication item further includes an item identifier that identifies the publication item; and wherein the publication node is configured to provide an update of the publication item with the publication classification and the item identifier.

6. The system of claim 1, wherein each node of the plurality of nodes is agnostic to connections between other nodes of the plurality of nodes.

7. The system of claim 1, wherein the plurality of transport nodes is configured to forward the publication item to the subscriber node based on the path, which is identified by the request.

8. The system of claim 1, wherein the publisher node is unaware of an address of the subscriber node.

9. The system of claim 1, wherein the subscriber node is unaware of an address of the publisher node.

10. A method comprising:

in a system that includes a plurality of nodes that are included in a plurality of services that operate on one or more processors, determining a plurality of connection identifiers for a plurality of respective connections to identify the respective connections, each node of the plurality of nodes having at least one connection of the plurality of connections with at least one other node of the plurality of nodes; and providing a request, using the one or more processors, from a subscriber node that is configured to consume a publication item to a publisher node that is configured to produce the publication item, the subscriber node and the publisher node included in the plurality of nodes, said providing comprising:

adding at least one of an incoming connection identifier, an outgoing connection identifier, or a node identifier to the request by each of a plurality of transport nodes, which are included between the subscriber node and the publisher node in the plurality of nodes, and at least one of the subscriber node or the publisher node to identify a path across which the request passes from the subscriber node to the publisher node, the request corresponding to the publication item, the incoming connection identifier identifying a connection of the plurality of connections from which the request is received by the respective node, the outgoing connection identifier identifying a connection of the plurality of connections to which the request is provided by the respective node, and the node identifier identifying the respective node.

11. The method of claim 10, wherein adding the at least one of the incoming connection identifier, the outgoing connection identifier, or the node identifier to the request by each of the plurality of transport nodes and the at least one of the subscriber node or the publisher node comprises:

adding a respective incoming connection identifier and a respective node identifier to the request by each of the plurality of transport nodes and the at least one of the subscriber node or the publisher node to identify the path.

12. The method of claim 10, wherein adding the at least one of the incoming connection identifier, the outgoing connection identifier, or the node identifier to the request by each of the plurality of transport nodes and the at least one of the subscriber node or the publisher node comprises:

adding a respective outgoing connection identifier and a respective node identifier to the request by each of the plurality of transport nodes and the at least one of the subscriber node or the publisher node to identify the path.

13. The method of claim 10, wherein adding the at least one of the incoming connection identifier, the outgoing connection identifier, or the node identifier to the request by each of the plurality of transport nodes and the at least one of the subscriber node or the publisher node comprises:

adding a respective incoming connection identifier, a respective outgoing connection identifier, and a respective node identifier to the request by each of the plurality of transport nodes and the at least one of the subscriber node or the publisher node to identify the path.

14. The method of claim 10, further comprising:

determining that a connection between a specified transport node of the plurality of transport nodes and the subscriber node is unavailable;

removing information regarding a subscription from the specified transport node; and transmitting a message that cancels the subscription to other transport nodes in the plurality of transport nodes.

15. A method for operating a first node in a network, the method being performed on a computer processor, the method comprising:

forming a first connection between the first node and a second node;

determining a first connection identification for the first connection;

forming a second connection between the first node and a third node;

determining a second connection identification for the second connection;

receiving a first subscription request on the second connection;

creating a second subscription request comprising at least a portion of the first subscription request and the second connection identification;

transmitting the second subscription request over the first connection;

receiving a first publication item over the first connection;
creating a second publication item comprising the first publication item and the first connection identification for transmission over the second connection;
monitoring the second connection to determine whether the second connection is active;
determining that the second connection is not active;
generating a message indicating that the second connection is not active; and
transmitting the message over the first connection.

16. The method of claim 15, further comprising:
forming a third connection between the first node and the third node;
determining a third connection identification for the third node;
receiving a third subscription request from the third node;
creating a fourth subscription request comprising at least a portion of the third subscription request and the third connection identification; and
transmitting the fourth subscription request over the first connection.

17. The method of claim 15, wherein the first publication item comprises a plurality of node identifications and connection identifications.

18. The method of claim 15, wherein the first subscription request comprises a first subscription classification that indicates a type of information the subscriber node is capable of consuming.

19. The method of claim 18, wherein the first publication item comprises a first publication classification that indicates a type of information included in the first publication item.

20. The method of claim 19, further comprising:
evaluating the first publication classification and the first subscription classification to determine that the first publication item meets the first subscription request; and
transmitting the second publication item subsequent to evaluating the first publication classification and the first subscription classification.

21. The method of claim 20, further comprising:
receiving a third subscription request from the third node;
determining a second subscription classification from the third subscription request;
evaluating the first publication classification and the second subscription classification to determine that the first publication classification does not meet the third subscription request; and
not transmitting the second publication item over the third connection.

* * * * *